United States Patent [19]

Fowler et al.

[11] 4,376,979

[45] Mar. 15, 1983

[54] UPDATED LOCK-POSITIONING OF FOLDABLE HELICOPTER BLADES

[75] Inventors: Donald W. Fowler, West Haven; Kenneth C. Arifian, Monroe, both of Conn.

[73] Assignee: United Technologies Corporation, Hartford, Conn.

[21] Appl. No.: 195,723

[22] Filed: Oct. 10, 1980

[51] Int. Cl.³ .................. G06F 15/20; B64C 27/50
[52] U.S. Cl. .................. 364/424; 244/17.13; 416/143
[58] Field of Search .......... 364/424; 244/17.13, 244/17.17; 416/134 A, 142, 143

[56] References Cited

U.S. PATENT DOCUMENTS

| | | | |
|---|---|---|---|
| 3,698,662 | 10/1972 | Rostad | 416/143 X |
| 3,765,794 | 10/1973 | Kudasch et al. | 416/143 |
| 3,874,817 | 4/1975 | Ferris | 416/143 |
| 4,252,504 | 2/1981 | Covington et al. | 416/143 |
| 4,268,222 | 5/1981 | Bernard | 416/143 X |

Primary Examiner—Felix D. Gruber
Attorney, Agent, or Firm—M. P. Williams

[57] ABSTRACT

The foldable rotor blades (12) of a helicopter are automatically adjusted to pitch angles where they can be locked as a prerequisite to folding, by commands generated (98, 112) to cause trim actuators (39-41) to drive swash plate servos (17-19) to the correct positions, initially (98) in response to stored trim references (120) and eventually (112) in response to the difference (109) between stored swash plate servo positions (120) and current servo positions (20-22). A claimed embodiment uses values of servo positions (20-22), just before unlocking the blades upon re-spreading them, to store, in nonvolatile memory (138), deviations (131) from nominal positions stored in read only memory, and generates (159) trim references in a subsequent folding operation in response to integrated values (166) to reduce actual position errors (162) toward zero from desired positions indicated by the stored deviations (148).

4 Claims, 10 Drawing Figures

UPDATED LOCK-POSITIONING OF FOLDABLE HELICOPTER BLADES

The Government has rights in this invention pursuant to Contract No. N00019-77-C-0202 awarded by the Department of the Navy.

TECHNICAL FIELD

This invention relates to positioning, or adjusting the pitch angle of foldable helicopter blades prior to locking the blades in their pitch axis to enable folding the blades near the helicopter fuselage during nonuse of the helicopter, and more particularly to automatically positioning the pitch of the main rotor blades to enable them to be locked in position prior to folding.

BACKGROUND ART

In certain helicopters used for specific applications, such as helicopters based on seagoing ships, it has long been known to fold the main rotor blades to positions adjacent the fuselage of the helicopter during nonuse of the helicopter. This facilitates storage of each helicopter in a relatively small space as well as rendering helicopters which are stored in the open less vulnerable to wind gusts and the like during storage.

In order to fold the blades, it is necessary that each blade assume a predetermined position with respect to the blade fold hinge, and with respect to the fuselage of the aircraft. Therefore, before folding blades, the main rotor is indexed to a predetermined position which puts all of the blades on the rotor in a position where each may be folded to a position alongside the fuselage. Thereafter, the pitch angle of each of the blades is adjusted to a desired position and the pitch angle is locked by means of pins, so that the pitch angle of the blades will not thereafter vary as the blades are being folded.

As is known, the pitch of the main rotor blades of a helicopter is adjusted by push rods which are urged against, and therefore raised and lowered by a swash plate which can tilt varying amounts in any azimuthal direction. It is the tilting of the swash plate which causes the blades to achieve the nominal collective pitch with the desired varying cyclic pitch superposed thereon. As the blades rotate about the main rotor in flight, the push rods connected to the blades and rolling on the swash plate assume various positions in dependence on the tilt of the swash plate and the azimuthal position of the rotor. Thus it is blade motion as the blades rotate which actually achieves the variation pitch in dependence upon the then-current position of the swash plate. Therefore, adjusting the pitch of the rotor blades prior to folding requires positioning of the swash plate, in a fashion similar to that achieved by the pilot controls and/or automatic flight control system during flight.

In the earliest systems, the pitch lock pins were generally displaced by hydraulic pressure, and the pitch positions of the blades were slewed back and forth by operation of manual controls (such as the cyclic pitch stick and the collective pitch stick) until each blade had passed by the pitch lock. The pin was able to snap into place and thereby prevent further pitch change of the blade. However, on-the-fly snap-in of locking pins results in excessive wear. Furthermore, hydraulically actuated lock pins are cumbersome and impede the ability to properly design a rotor head for a helicopter. Electric motor actuated pins, on the other hand, are well suited to rotor head design, but require that the pins be given a sufficient time to engage the blades while they are held in the proper position. This would have required the use of pilot indicators to show the pilot correct blade pitch positions for pin engagement, the pilot moving the controls very slowly to achieve indications and to provide minute adjustments in pitch position once the indicators are lit until pin engagement was achieved. A motorized blade fold lock of a modern type is disclosed in a commonly owned, copending U.S. patent application of Ferris entitled BLADE FOLD RESTRAINT SYSTEM, Ser. No. 35,364, filed on May 2, 1979 and now U.S. Pat. No. 4,284,387.

In order to serve some of the needs of blade folding systems, automatic positioning of the rotor blades in pitch has been achieved as described in a commonly owned, copending U.S. patent application entitled AUTOMATIC LOCK-POSITIONING OF FOLDABLE HELICOPTER BLADES, Ser. No. 195,808, filed on even date herewith by MacLennan and Mulvey. In that system, the positions of the three swash plate servos, for the desired pitch angle of the blades to enable the blades to be locked in pitch prior to folding, is stored in a nonvolatile read/write memory of an automatic flight control system computer. After a first initial locking of the blades, the desired swash plate positions and trim commands (which were required for the automatic flight control system pitch, roll and collective axes) are stored in that memory. In each subsequent folding operation, the final flight control commands and final swash plate servo positions which were used in the preceding blade folding operation are again used to position the blades in pitch before locking. With periodic updating of the ultimate swash plate servo positions which should be achieved in order to engage the pins, and considering the fact that there is some latitude in positioning, due to the shape of the pins and their ability to minutely adjust the pitch as they are engaging, this system can work quite well under many circumstances.

On the other hand, if any of the swash plate servos or position detectors are changed during maintenance between one folding operation and the next, this system will be utilizing obsolete information in a subsequent folding operation. Additionally, it has been found that the storage of digital data relating to both the swash plate servo positions (which provide proper pitch for blade locking) and the automatic flight control system commands (in pitch, roll and collective axes to achieve these positions) requires more nonvolatile read/write storage than is convenient in an airborne flight control system.

DISCLOSURE OF INVENTION

Objects of the invention include improvements in positioning pitch angle of the helicoptor rotor blades prior to blade folding operations.

According to the present invention, an automatic flight control system provides commands to the pitch, roll and collective trim channels of the main rotor pitch controls in response to the positions of the swash plate servos at a point in time just prior to unfolding the helicopter blades, the information being stored in the form of the deviation of such positions from nominal positions that are stored in permanent read-only memory and need not be stored in nonvolatile memory. In further accord with the present invention, movement of the desired swash plate position is achieved by calculation of the pitch, roll and collective commands necessary to be provided to the mixer (which converts these three commands into separate and distinct commands relating to the forward, aft and lateral swash plate servos), thereby eliminating the need to store flight commands utilized in one blade positioning operation for use as a starting point in a subsequent blade folding operation. In further accord with the present invention, an integrator is used in each of the swash plate servo channels to determine a desired swash plate position in order to achieve desired blade pitch for locking, to eliminate long term, steady state errors therein, the pitch, roll and collective trim commands being generated in response to the respective swash plate servo position integrators. In accordance with another aspect of the invention, positioning of the pitch of the tail rotor blades, to provide a known coupling between the tail rotor blades and the longitudinal cyclic pitch (or pitch) axis of the main rotor, is achieved in a system in which the pitch trim position detector does not reflect actual pitch, but only pitch relative to the last synchronization of yaw trim position.

The present invention overcomes the difficulty of utilizing obsolete information stored from a previous blade folding operation. For instance, if the swash plate servos or any of the actuators receive maintenance between the previous folding operation and the present folding operation, the positional information might be inaccurate. The invention also provides closed-loop operation by means of integration of any errors in positioning of the servos with trim commands. The invention, by using only deviations from nominal desired servo positions, saves precious nonvolatile, read/write memory space.

The present invention may be implemented in a variety of ways, utilizing apparatus and techniques which are well within the skill of the art in the light of the teachings which follow hereinafter. Other objects, features and advantages of the present invention will become more apparent in the light of the following detailed description of an exemplary embodiment thereof, as illustrated in the accompanying drawings.

BEST MODE FOR CARRYING OUT THE INVENTION

Figure 1:
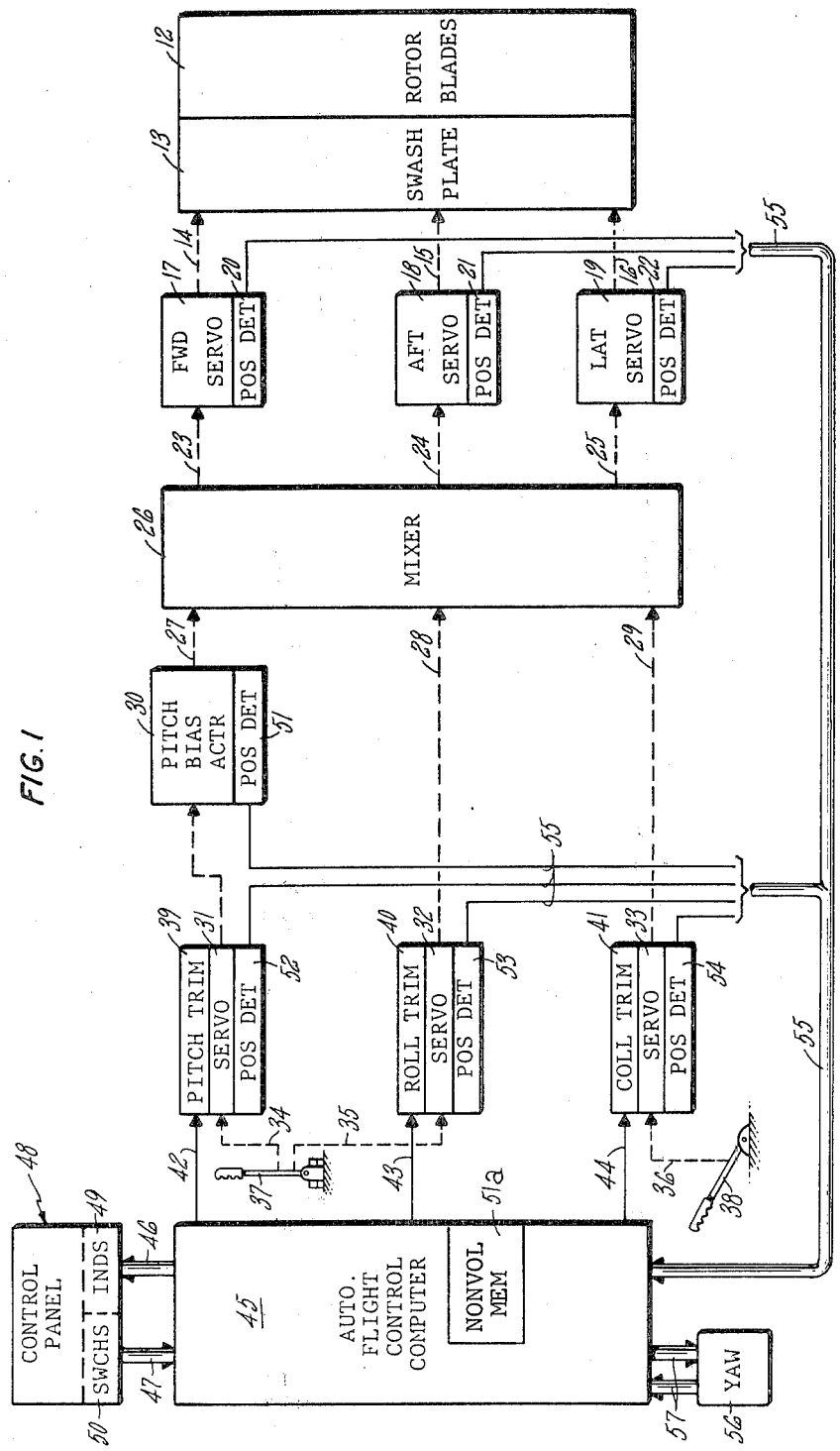
FIG. 1 is a simplified schematic block diagram of a helicopter blade pitch control system, employing an automatic flight control system computer, in which the present invention may be practiced.

Referring now to FIG. 1, a conventional helicopter with suitable apparatus to permit practice of the present invention includes main rotor blades 12, each of which is pivotable about a longitudinal axis in response to the position of a related push rod (not shown) which contacts a swash plate 13. When the main rotor is stationary, the degree of tilt and azimuthal position of tilt of the swash plate 13 in combination with vertical positioning of the swash plate determines a position for all of the push rods, thereby establishing a particular pitch angle for each of the blades. When the rotor blades 12 are rotating (the swash plate is always nonrotating), the push rods cause the pitch angle of each of the rotor blades to vary in a cyclic fashion as a consequence of rotation thereof relative to the swash plate 13.

The swash plate 13 is connected by mechanical linkage 14–16 to a plurality of servos 17–19 which are spaced about the swash plate and which can therefore control the positioning of the tilt axis, the degree of tilt and vertical position of the swash plate 13. Although spacing of the servos can vary from one case to the next, in the example herein it is assumed that the servos have the common configuration of a servo 17 being located forward of the rotor axis, a servo 18 being located aft of the rotor axis, and a servo 19 being located to the side of the rotor axis, they being referred to herein as forward, aft and lateral servos. In order to provide closed-loop feedback control, and otherwise to determine the pitch angle of all of the rotor blades (by determining the tilting of the swash plate 13), a plurality of position detectors 20–22 are provided for the respective servos. These position detectors may comprise potentiometers working from a regulated power supply, or linear differential voltage transformers, or any other suitable position detector as is known in the art.

Each of the servos 17–19 has a mechanical input member 23–25 from a mixer 26 which receives mechanical inputs 27–29 from each of three flight control axes: pitch, roll and collective (or lift). Depending upon the particular helicopter in which the present invention is practiced, these axes may have series actuators or they may not. For instance, the pitch axis input 27 to the mixer 26 is provided by a pitch bias actuator 30 which is in series with a servo 31, whereas the roll input 28 and collective input 29 are provided directly by related servos 32, 33. Or, the servos 31–33 may have direct series inputs for automatic flight control inputs, which can be accommodated in the same fashion as the series actuator 30 (described hereinafter). The servos 31–33 are typically boost servos which have mechanical input 34–36 from the two axes of a cyclic pitch stick 37 and from a collective pitch stick 38, respectively. Thus motion of one of the sticks moves the input to the servo, which hydraulically boosts the motion so that the desired activity is achieved with relatively low force applied to the sticks 37, 38.

The input to each of the servos 31–33 has a suitable electrically-controlled trim actuator 39–41 (either electric motor or hydraulic) which is responsive to a corresponding electric connection 42–44 from an automatic flight control computer 45. Provision of suitable trim command signals on the connections 42–44 by the computer 45 can cause the actuators 39"41 to control the pitch angle of the main rotor blades, thereby to adjust the angle when on the ground in order to enable locking prior to folding of the blades, or to control the flight profile of the aircraft when in flight. The automatic flight control computer may take the form of one of the computers described in a commonly owned, copending U.S. patent application of Murphy and Clelford, Ser. No. 938,583, filed on Aug. 31, 1978, now U.S. Pat. No. 4,270,168 and entitled SELECTIVE DISABLEMENT IN FAIL-OPERATIONAL, FAIL-SAFE MULTI-COMPUTER CONTROL SYSTEM. A computer of that type has output and input connections 46, 47 to and from a control panel 48 which may include indicators 49 and switches 50 to allow a pilot to interchange with the automatic flight control computer 45, and the capability of receiving inputs from inertial devices such as accelerometers and gyros, and various position indicators. The computer may also have a nonvolatile read/write memory 51a therein or associated therewith. As seen in FIG. 1, each of the position detectors 20–22 and similar position detectors 51–54 (relating to corresponding actuators and servos 30–33) may be connected into the automatic flight control computer 45 by a plurality of corresponding connections 55. The automatic flight control computer 45 may interconnect with other apparatus of the aircraft through multiplexed inputs and outputs which include analog conversion where necessary, all as is well known in the art and as described in the aforementioned Murphy and Clelford patent.

Although not shown further in detail herein, the aircraft may also include a servo operated yaw channel 56 which is suitably connected to the automatic flight control computer by connections 57. This channel includes a pitch beam for controlling the pitch angle of the tail rotor blades, the pitch beam being positioned by a servo in a well known fashion. As is described briefly hereinafter, if the tail rotor is tilted, as is shown in U.S. Pat. No. 4,103,848, there may be coupling between the yaw axis and the pitch axis of the helicopter which requires some consideration in the blade folding operation. However, the coupling is not itself part of the present invention, is conventional and known and is therefore not described further herein.

The manner of carrying out the invention is described using as an example one of the automatic flight control computers disclosed in the aforementioned Murphy and Clelford patent. In that patent, two identical computers are disclosed as working together in a particular fashion; but the utilization of one of them to perform the intended functions (without the inter-computer functions) is readily achieved in the light of the teachings which follow hereinafter.

In the computer of the aforementioned patent, all of the flight control functions are performed during specific interrupts. To reach these programs, a general background routine, referred to as a background (BG) program is interrupted in a real time fashion, and each interruption causes a particular sequence of utility programs to be performed. The programs relate to generating automatic pilot commands, stability commands, bias commands, stick force commands and the like. The programs also provide many functions to determine the operational health of each computer and the health status communicated to it by the other computer, to determine the manner in which the two computers may handle the work load. In one of the routines reached in the aforementioned computer, functions to be performed when the aircraft is on the ground are reached in a third autopilot routine (AP 3) which is illustrated, as modified to practice blade folding, in FIG. 2 herein.

Figure 2:
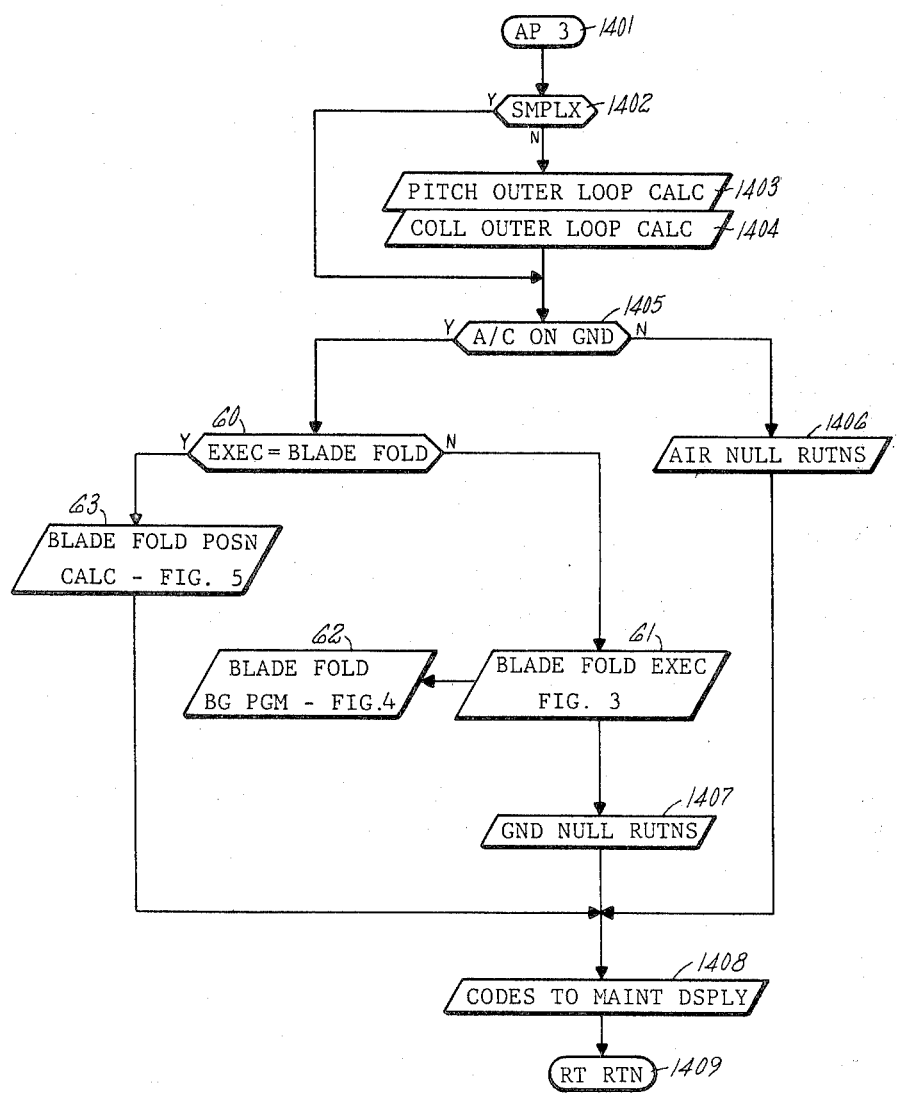
FIG. 2 is a simplified logic flowchart of a portion of an automatic flight control system program in which routines related to folding the blades may be reached when the aircraft is on the ground.

In FIG. 2 the four-digit reference numerals are the corresponding reference numerals found in FIG. 14 of the aforementioned Murphy and Clelford patent, the two-digit reference numerals are peculiar to the present disclosure. In FIG. 2, the third autopilot routine is reached through an entry point 1401 and a test 1402 determines if the particular computer is operating in a simplex mode or not. If it is not, then both computers are operating together and, in accordance with the twin computer reliability scheme of the aforementioned Murphy and Clelford patent, a pitch outer loop calculation 1403 and a collective outer loop calculation 1404 may be performed. But in the aforementioned patent, if only one computer is operating, it is not permitted to perform potentially disastrous functions such as operating the autopilot, so that the calculations 1403 and 1404 are bypassed by an affirmative result of test 1402. However, in an embodiment of the invention employing only a single computer, the test 1402 may be eliminated so that the pitch and collective outer loop calculation routines 1403 and 1404 will always be performed. Of course, use of a single computer requires other steps to determine the reliability of computer operation. In fact, the pitch outer loop calculation is a calculation which, with pitch output routines (of said patent), will provide the pitch trim command signal on the connection 42 (FIG. 1 herein). Similarly, the collective roll and yaw routines (including the collective outer loop calculation routine 1404 and other routines of said patent not shown herein) will provide the trim command signals on the connections 43, 44 and 57 (FIG. 1), in manners which are described hereinafter.

In FIG. 2, a test 1405 determines if the aircraft is on the ground. This tests a status indicator bit or word indicative of pressure on the helicopter wheels, the rotor being locked, and other factors. If test 1405 is negative, then the computer may perform air null routines 1406 which reestablish the nulls of various inertial sensors, and may perform other routines not related to the present invention. Then a step 1408 may transfer failure and fault codes to a maintenance display and the program will advance to other functions through a real time return point 1409, which is the manner of releasing the real time interrupt through which the third autopilot routine of FIG. 2 is reached, to return to a background program. All of the foregoing is described in far more detail in the context of an entire automatic flight control computer system in the aforementioned Murphy and Clelford patent.

In FIG. 2, if the aircraft is on the ground, as indicated by an affirmative result of test 1405, then a test 60 will determine if the executive control mode of the computer is set in a blade fold mode or not. In the present example, the blade fold executive mode is deemed to include the service executive mode (in contrast with a nonservice mode and a maintenance mode, as described in the aforementioned Murphy and Clelford patent).

The nature and purpose of this, and the manner of establishing it are described with respect to FIGS. 3 and 4, hereinafter. In a first instance, test 60 will normally be negative so that the blade fold executive routine 61 (described with respect to FIG. 3 hereinafter) will be reached. Depending on how the routine 61 proceeds, the computer may have its executive mode switched into the blade fold mode, in which case the routine 61 will lead to a blade fold background program 62 by releasing the real time interrupt within which the third autopilot routine of FIG. 2 has been reached. Thereafter, the basic computer background program is the routine 62, and all of the normal computer functions are reached by interrupting the routine 62 (in contrast with interrupting a general background program, when the computer is in the service mode, in which self health tests such as a check sum test routine and a scratch pad test are performed, as illustrated in FIG. 4 of the aforementioned Murphy and Clelford patent). In FIG. 2, if the blade fold executive routine 61 does not determine that the blade folding operation is ready to proceed, it will lead to other routines, such as ground null routines 1407, the codes to maintenance display routine 1408 and then end the real time interrupt through the real time return point 1409. Eventually, the routine 61 may establish the executive in the blade fold mode in which case the test 60 will be affirmative, leading to a blade fold position calculation routine 63 which is described with respect to FIG. 5 hereinafter. This is the routine that actually provides the pitch, roll and collective trim commands necessary to position the pitch angle of the main rotor blades to enable them to be locked in anticipation of a folding operation.

Figure 3:
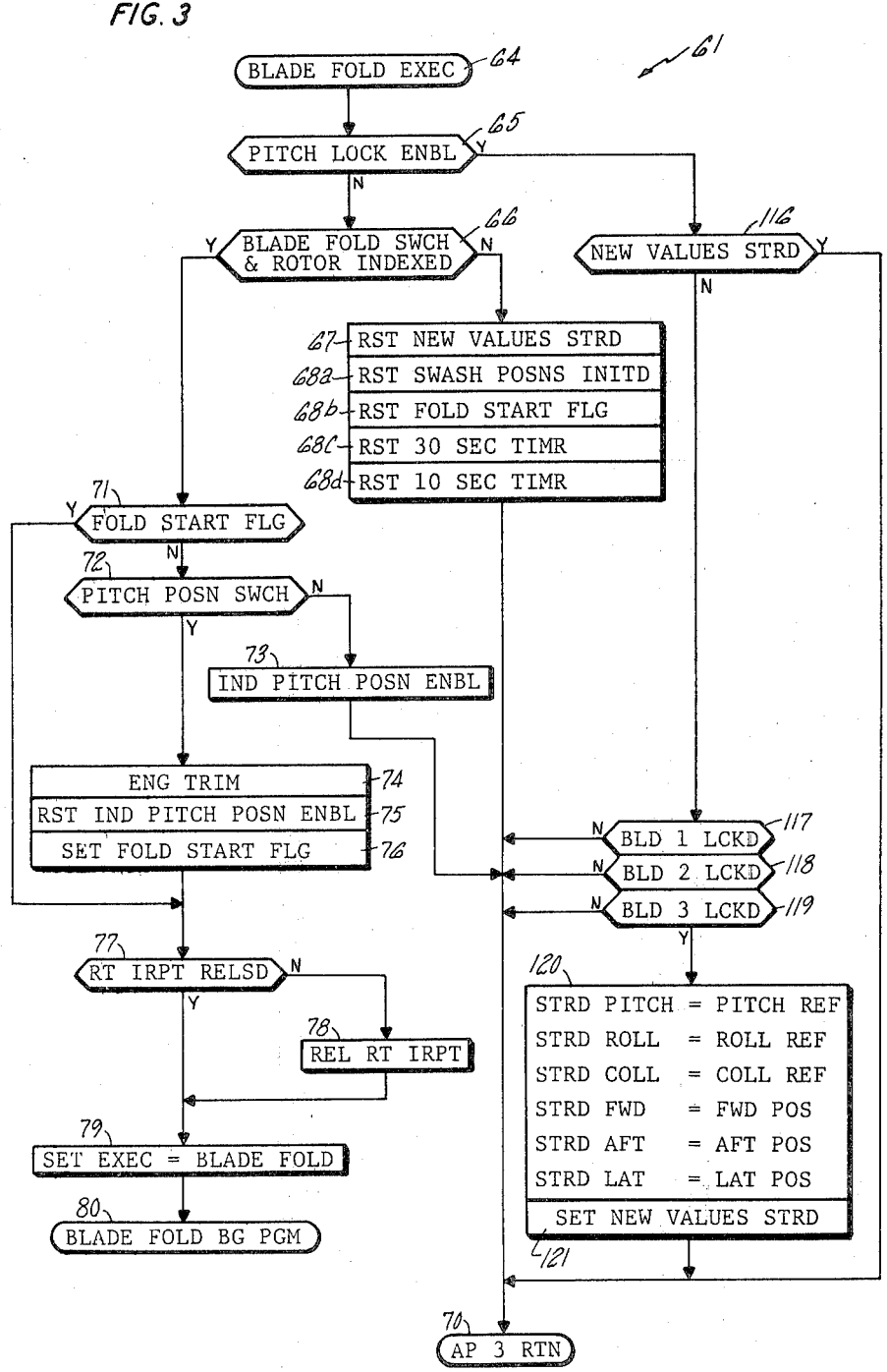
FIG. 3 is a simplified logic flowchart of an executive routine for controlling the operation of an automatic flight control system during blade fold operations.
Figure 4:
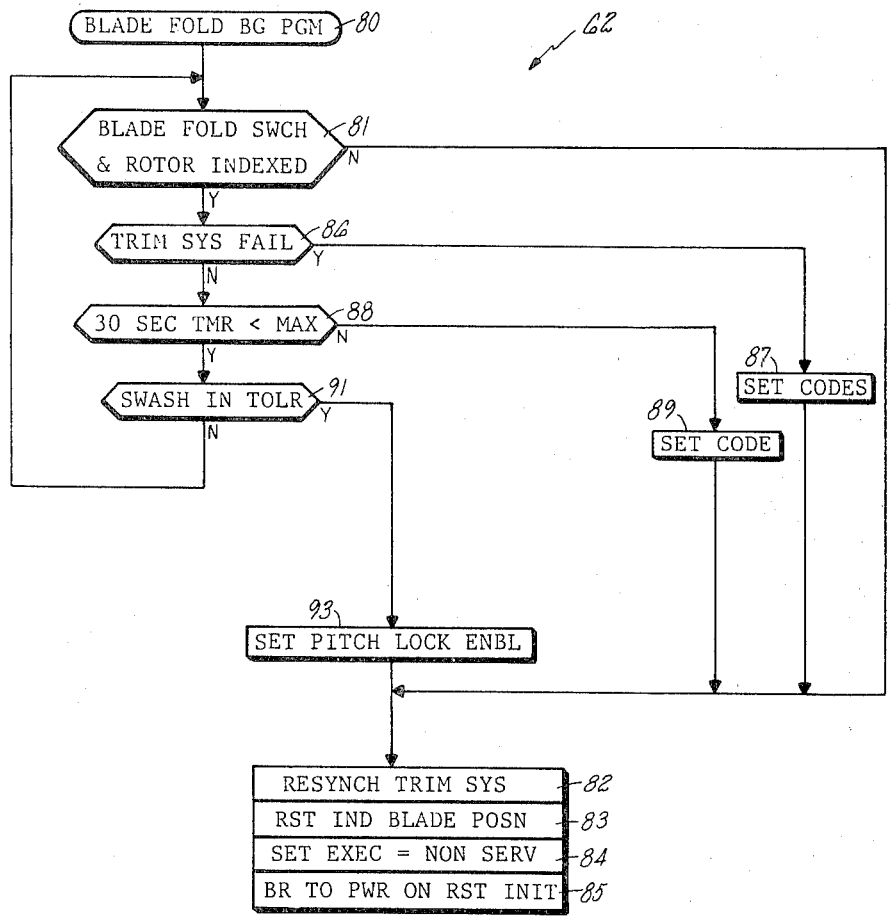
FIG. 4 is a simplified logic flowchart of a blade fold background program, from which computer interrupts may reach utility programs in practicing the present invention.

In FIG. 3, the blade fold executive routine 61 is reached through an entry point 64 and a first test 65 determines whether a pitch lock enable flag has been set yet or not. In a first pass through the routine of FIG. 3, the pitch lock enable flag normally will not have been set so that a negative result of test 65 will reach a test 66. This determines if the rotor has been indexed to the desired position for blade locking, as indicated by a suitable flag bit, and whether the pilot has activated a blade fold switch. Normally, the test 66 will be negative during a first pass through the routine of FIG. 3 so that a plurality of blade fold initiation steps will be reached, over and over, until the rotor is indexed to the correct position and the pilot has engaged the blade fold switch. The initiation steps include a step 67 to reset a new values stored flag, a step 68a to reset a swash positions initiated flag, a step 68b to reset a fold start flag (a local flag utilized only in the routine of FIG. 3 as described hereinafter), and steps 68c, 68d to reset a thirty second timer and a ten second timer. Then, the program will return to the third autopilot routine of FIG. 3 through a return point 70. The short pass through the blade fold executive routine 61 which merely provides the initialization steps 67–68d will be performed whenever the aircraft is on the ground unless and until the pilot decides to initiate a folding operation by first indexing the rotor to the correct azimuthal position for blade folding, and thereafter performing the very first step, which is to engage the blade fold switch so that test 66 can be affirmative.

In FIG. 3, when test 66 is affirmative, a test 71 determines whether or not a local fold start flag has been set. This flag simply ensures that certain functions are performed once and only once in each blade fold operation. Since the fold start flag is reset in test 67 during pre- folding initialization, the initial pass through step 71 is always negative. This causes a test 72 to determine whether or not the pilot has engaged a pitch position switch, which is the second stage of blade folding controlled by the pilot. If the switch has not been engaged, a negative result of test 72 will reach a step 73 which provides a signal that causes the indicators 49 (FIG. 1) to indicate pitch position enable so that the pilot knows that the sequence has reached the stage where he should engage the pitch position switch if he wishes to continue with the blade folding operation. In such case, the step 73 is the only step performed in the blade fold executive routine 61 during the current cycle, and the third autopilot routine is returned to through the return point 70.

In a subsequent pass through the blade fold executive routine 61, the pilot will have eventually engaged the pitch position switch so that step 72 is affirmative. In such case, a step 74 causes the trim system to be engaged (that is, so that the computer can cooperate with the trim valves 39–41, FIG. 1, so as to adjust the pitch position of the blades for the folding operation). Then a step 75 resets the indicate pitch position enable flag which was set in step 73 so the pilot knows that his engagement of the pitch position switch has been recognized. And a step 76 will set the fold start flag so that, in subsequent passes through the blade fold executive routine 61, test 71 will be affirmative, therefore bypassing the steps 73–76.

In FIG. 3, once the fold start flag has been set, a test 77 determines if the real time interrupt (the interruption of the program which causes reaching the third autopilot routine of FIG. 2) has been released; if not, a step 78 causes releasing of the real time interrupt. This requires simply enabling all interrupts of the same or lower priority as that of the real time interrupts; and, the program will simply advance in a fashion that does not lead to an interrupt return (so that the return to the normal background program which is in effect when the executive mode of the computer is in the service mode will not be reached). Then the executive of the computer is set into the blade fold mode by a step 79, and the blade fold background program is reached through a transfer point 80.

In FIG. 4, the blade fold background program 62, reached through the transfer point 80, is basically a closed-loop that can only be exited by taking the executive out of the blade fold mode, essentially ending the blade fold operation. This may be done as a consequence of changes in operation or failures which may occur, or as a consequence of having satisfactorily completed the blade pitch positioning function of a blade folding operation (which is the only function that the automatic flight control computer 45, FIG. 1, performs during blade folding). Specifically, the blade fold background program 62 begins with a test 81 to determine if the blade folding operation is still in progress, as indicated by the blade fold switch still being engaged and the rotor still being indexed. This is the same as test 66 in FIG. 3. In the event that the rotor is inadvertently moved from its folding index position, or if the pilot changes his mind and disengages the blade fold switch, then a negative result from test 81 will cause the blade fold background program to advance to a step 82 to resynchronize the trim system to desired trim positions, thereby to eliminate any blade positioning which may have occurred as a result of the blade positioning routines being performed for several cycles before the pilot changes his mind. A step 83 causes the blade fold indication to be reset, a step 84 sets the executive mode into the nonservice mode and a step 85 causes the program to branch to an initialization portion of the program at or close to that which occurs for a power on reset (which may be somewhere in the regime of steps 400-405 in FIG. 4 of the aforementioned Murphy and Clelford patent), in any fashion which is suitable depending upon the particular computer and implementation of the present invention. The steps 82-85 effectively shut down the blade fold positioning operation and cause the automatic flight control system to reinitiate for normal flight modes.

In FIG. 4, a second test in the blade fold background program 62 is test 86 which determines if any of the tests which may be performed on the trim system have failed, causing a trim system failure flag to be set. If there has been failure of the trim system, the test 86 will reach a step 87 to set appropriate maintenance codes, which may depend upon the particular nature of the failure, and cause the blade fold mode to be ended by steps 82-85 as described hereinbefore. Another test 88 will determine if blade fold positioning has been in process for less than thirty seconds. If not, the positioning process has taken too long and therefore cannot be completed because of some condition of the helicopter external of the computer or some inability of the computer to provide correct positions. In such case, a negative result of test 88 will reach a step 89 that sets an appropriate failure code, and the blade fold operation is terminated by steps 82-85 as described hereinbefore.

In FIG. 4, the normal way of exiting the blade fold background program 62 is by means of a test 91 which tests a flag (generated as described hereinafter) which determines that the swash plate has been positioned within tolerance and therefore the blade pitch angle positioning for a blade fold operation has been successfully completed. An affirmative result from step 91 leads to a step 93 which sets a pitch lock enable flag; this is a flag that indicates successful completion of blade pitch positioning, enabling pitch lock motors to drive pitch lock pins so as to retain the established blade pitch angle during the folding operation. Then, the blade fold positioning operation of the computer is terminated by steps 82-85 as described hereinbefore.

Once the blade fold background program 62 of FIG. 4 has been entered by the transfer point 80, it will generally continuously cycle through the tests 81, 86, 88 and 91, returning to the test 81, and so forth. This is a locked program loop which can be exited only as a consequence of test results as described immediately hereinbefore, or by means of program interrupts. The program interrupts are real time interrupts that causes the computer routine to jump out of the blade fold background program and to perform all of the normal utility programs, including the third autopilot routine of FIG. 2 and the routines reached therein. Thus while the automatic flight control system computer 45 is in fact being utilized to provide commands on the connections 42-44 (FIG. 1) so as to drive the swash plate for correct blade pitch angles to permit folding of the blades, the utility programs, and particularly those related to blade folding, are all reachable by means of the normal real time interrupts. When these programs have been completed in each cycle, the computer automatically branches back to the blade fold background program 62 by means of interrupt release, in the normal fashion. As is apparent from a full understanding of all of the routines described hereinbefore and hereinafter, the only function of the blade fold background program is to monitor the desirability of retaining the computer executive in the blade fold mode. And, this is utilized in the third autopilot routine of FIG. 2 simply to either cause passage through the blade fold executive program 61 or passage through the blade fold position calculation routine 63, as described hereinafter. Of course, other programming arrangements could be selected to provide similar functions, with or without utilizing a background program. This in turn may depend somewhat upon the particular automatic flight control system computer utilized to implement the present invention, in accordance with the skill of the art.

Figure 5:
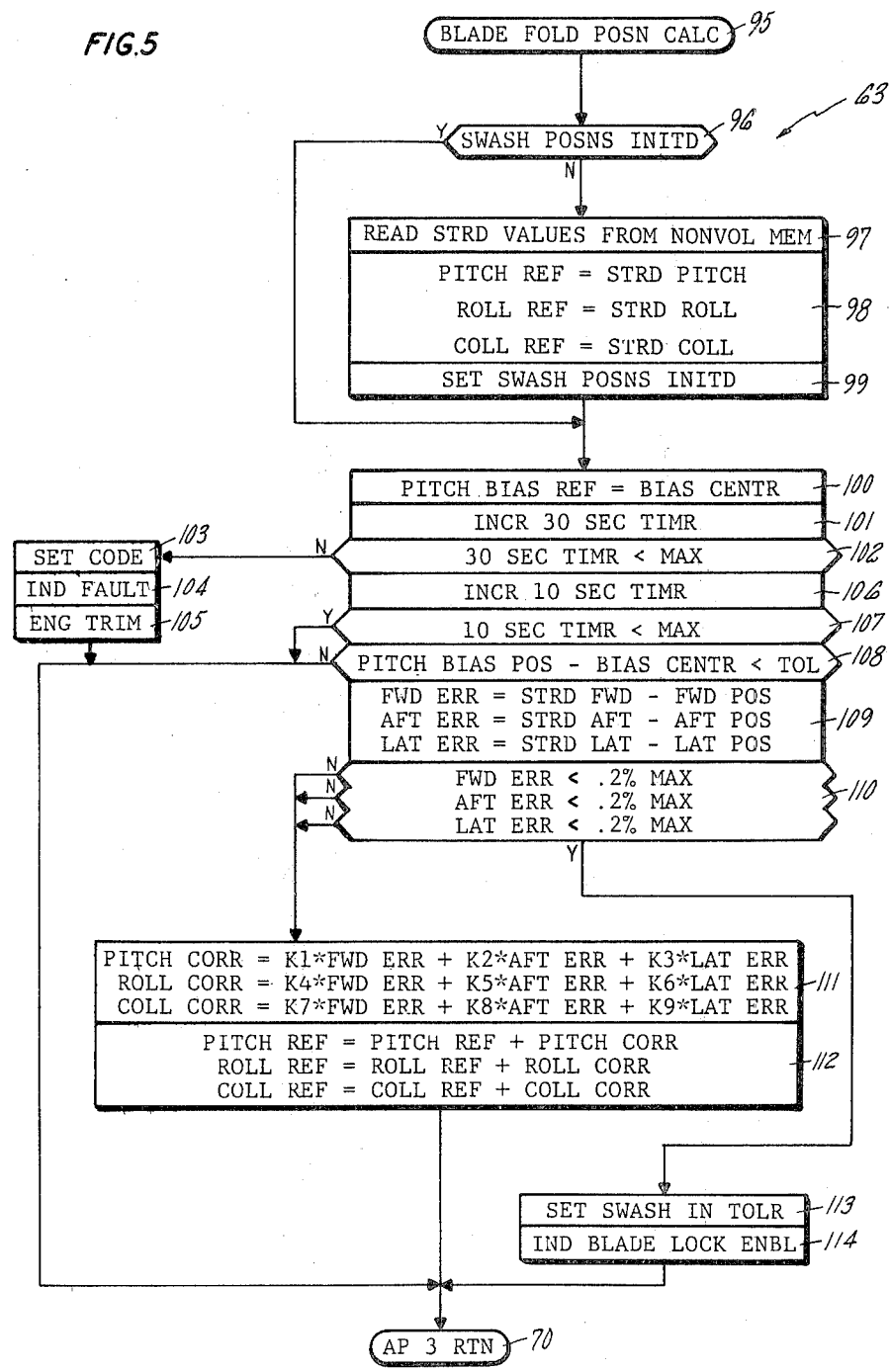
FIG. 5 is a simplified logic flowchart of a blade fold position calculation routine.

Once the executive program has been set into the blade fold mode by step 79 within the blade fold executive program 61 of FIG. 3, each pass through the third autopilot routine of FIG. 2 will cause the test 60 to be affirmative so that the blade fold position calculation routine 63 will be reached, through an entry point 95 in FIG. 5. A first test 96 determines if position values have been initiated, by interrogation of the flag reset in step 68a, FIG. 3. If not, a step 97 causes the stored values of pitch, roll and collective references and the stored values of desired swash plate servo positions to be read into the working portion of the computer from nonvolatile read/write memory. These are provided in the nonvolatile read/write memory at the conclusion of a preceding blade folding operation as is described with respect to FIG. 3, hereinafter.

Then, a series of steps 98 cause the pitch reference, roll reference and collective reference values, to be utilized in generating trim commands on the connections 42-44 (FIG. 1), to be respectively set equal to the stored pitch, stored roll and stored collective values which were determined in the previous blade operation. Then a step 99 sets the position initiated flag which was tested in step 96 so that in subsequent passes through the blade fold position calculation routine 63, the stepe 97-99 will be bypassed.

If any implementation of the invention includes a series actuator, such as the pitch bias actuator 30, FIG. 1, it may be desirable to force such actuator to a known position so as to achieve repeatability of swash plate positioning, without any adverse effect by the series actuator. Therefore, a step 100 may, in each pass through the blade fold position calculation routine 63, cause the pitch bias reference value to be equal to the center position of the pitch bias actuator 30 (FIG. 1). This provides a simple method of utilizing the regular pitch bias command generation (such as that shown in the aforementioned Murphy and Clelford patent) to center the series actuator in an open loop fashion. Then a step 101 will increment the thirty second timer which was previously reset in step 68c of FIG. 3. A test 102 determines if the thirty second timer has been incremented to less than its maximum value; if not, this indicates that the blade fold position calculation has been in process over many cycles spanning thirty seconds in time, which is an indication that something is wrong. Therefore a negative result of test 102 will lead to a step 103 which sets a failure code, a step 104 which provides a fault indication to the pilot, and a step 105 which forces the trim system to be engaged (so that it can be resynchronized in the fashion described with respect to FIG. 4 hereinafter as the necessary consequence of an excessive time terminating the blade fold position operation of the computer). In such case, the program will revert to the third autopilot routine of FIG. 2 through the transfer point 70.

In a normal case, the thirty second timer will not have timed out, so the test 102 will be affirmative leading to a step 106 which increments a ten second timer. Then a test 107 determines if the ten second timer has been incremented in a sufficient number of cycles so as to have reached its maximum count or not. If the setting of the ten second timer is less than its maximum, an affirmative result of test 107 causes the program to advance directly back to the third autopilot routine by means of the return point 70. This provides ten seconds within which successive computer program cycles can utilize the reference positions established in steps 98 to cause trim commands to be generated and utilized, in a fashion described with respect to FIG. 1 hereinbefore, so as to position the swash plate 13 to desired reference values. There is no point in determining whether or not these reference positions have been reached until there has been sufficient time for them to be reached. Since the blade pitch positioning system has a response characteristic of 10% of authority per second, a time frame of ten seconds will ensure that the rotor blades could be rotated from any blade pitch angle to a desired blade pitch angle within the ten second time frame, since 100% of authority would be encompassed. Therefore, when the ten second timer has been incremented sufficiently to reach its maximum count, test 107 will be negative causing a test 108 to determine if the series bias actuator, such as a pitch bias actuator, has reached a position equal to a stored center position. If not, a negative result of test 108 will cause the third autopilot program to be resumed through the return point 70. But assuming that the series actuator can be suitably positioned within the ten second time frame or shortly thereafter, test 108 will eventually be affirmative leading to steps 109, which determine the error between the desired swash plate servo positions and the stored swash plate servo positions which are believed to be corrent to enable blade locking to occur. Then a series of tests 110 determine if all of the errors in swash plate servo position are less than 0.2% of the maximum range of positions. If any of them is not within 0.2%, a negative result of one of the tests 110 will cause correction of the position by means of steps 111 and 112. In steps 111, pitch, roll and collective corrections relating to the current error in the individual swash plate servos (forward, aft and lateral) are generated by a matrix which is inverse to the function of the mixer 26 (FIG. 1). In other words, the constants K1-K9 used in steps 111 to cause pitch, roll and collective correction factors to be generated, are those that indicate adjustments to the pitch, roll and collective commands which will result in suitable adjustments to the forward, aft and lateral swash plate servo positions taking into account the effect that the mixer 26 (FIG. 1) has in transposing the aircraft axis commands to the swash plate servo commands. This is referred to herein as an inverse mixer matrix. Then, steps 112 cause the pitch, roll and collective reference values, which were established initially in steps 98, and which control the commands provided to the pitch, roll and collective trim valves 39-41, to be updated by addition thereto of the correction factors generated in steps 111. Then the program can advance back to the third autopilot program of FIG. 2 by means of the return point 70.

Eventually, after several passes through the blade fold position calculation routine 63 of FIG. 5, if the factors being used and all of the equipment operations are proper, the forward, aft and lateral swash plate servos will be positioned within 0.2% of the previously stored values, indicating that blade locking can take place. Therefore, the tests 110 will be affirmative causing a step 113 to set a flag indicative of the fact that the swash plate has been positioned within tolerance; and, a step 114 will cause an indication that blade lock is enabled, so that the pilot can operate the blade lock pin insertion motors or other means. And then, the third autopilot routine is returned to by means of the return point 70.

In FIG. 2, completion of each pass through the blade fold position calculation routine 63 will lead to the codes to maintenance display routine 1408 and to the real time interrupt return 1409. This causes release of the real time interrupt so that the computer reverts to the blade fold background program 62 as illustrated in FIG. 4. Because the basic loop of the blade fold background program routine consists only of four tests, it is well assured that at computer speeds normally encountered, all of these four tests will be made many times before the next real time interrupt causes the program to revert to the routines caused by interruptions. Thus it is well assured that test 91 will be made, and since the swash in tolerance flag was set in step 113, as described hereinbefore with respect to FIG. 5, this test will be affirmative. Therefore, step 93 will set the pitch lock enable flag (which is a significant advancement in the routine as described hereinafter) and steps 82-85 will cause the computer to pass out of the blade fold background program and refer to the nonservice mode for reinitialization purposes. Eventually, the third autopilot routine of FIG. 2 will again be reached during one of the real time interruptions, and test 60 will not be negative so that the blade fold executive routine 61 (FIG. 3) will again be reached. In this case, test 65 in FIG. 3 will be affirmative since the pitch lock enable flag has been set in step 93 of FIG. 4. An affirmative result of test 65 will reach a test 116 which determines if a one-time local flag has been set, indicative of whether or not the new values have been stored as yet. Initially, test 116 will be negative so that a plurality of tests 117-119 may be reached to determine if all of the blades have been locked in pitch angle. If any of the tests 117-119 is negative, the computer will revert to the third autopilot routine through the return point 70. In subsequent passes through the third autopilot routine (FIG. 2) which lead to the blade fold executive routine 61 (FIG. 3), eventually all of the blades should be locked so that all of the tests 117-119 will be affirmative. This will lead to a series of steps 120 which cause the present values of pitch, roll and collective trim reference to be stored for use in subsequent blade folding operations and cause the final positioning of the forward, aft and lateral swash plate servos to be stored for use in a subsequent blade fold operation. These are the values which are accessed by step 97 in the blade fold position calculation routine 63 (FIG. 5). Once the steps 120 are completed, the new values stored flag is set in a step 121. Therefore, in any subsequent passes through the blade fold executive routine 61 in FIG. 3, when the pitch lock enable flag is still set, step 116 will be affirmative, so that no functions are performed by the blade fold executive program.

Thus there has been described a system which positions the swash plate servos by means of autopilot trim commands so that the blade pitch angle of helicopter blades can be locked before folding. When the blades are locked, the autopilot trim references used to command the swash plate servos are stored for use in a subsequent blade folding operation, along with the final swash plate servo positions at which the blades were ultimately locked.

In accordance with the invention, an improved system for automatically positioning the pitch angle of rotor blades to enable locking prior to folding of the blades, stores the positions of the swash plate servos which occur at the time of spreading (unlocking) the blades, for use in a subsequent blade folding operation. In the embodiment of the invention to be described hereinafter, no autopilot trim references are stored for use in subsequent blade folding operations; instead, only the swash plate servo positions are stored, and the autopilot trim commands required to cause the swash plate servos to reach such positions are calculated from the stored servo positions. This avoids the necessity of storing trim command references in the nonvolatile read/write memory, space within which is at a premium. In addition, in the embodiment of the invention to be described, the precise swash plate servo reference position information is stored as the deviation from nominal position values. Only the deviations need to be stored in the nonvolatile read/write memory, the nominal values being, in a sense, wired into the computer by being present in a read only memory, space within which is not at a premium.

Figure 6:
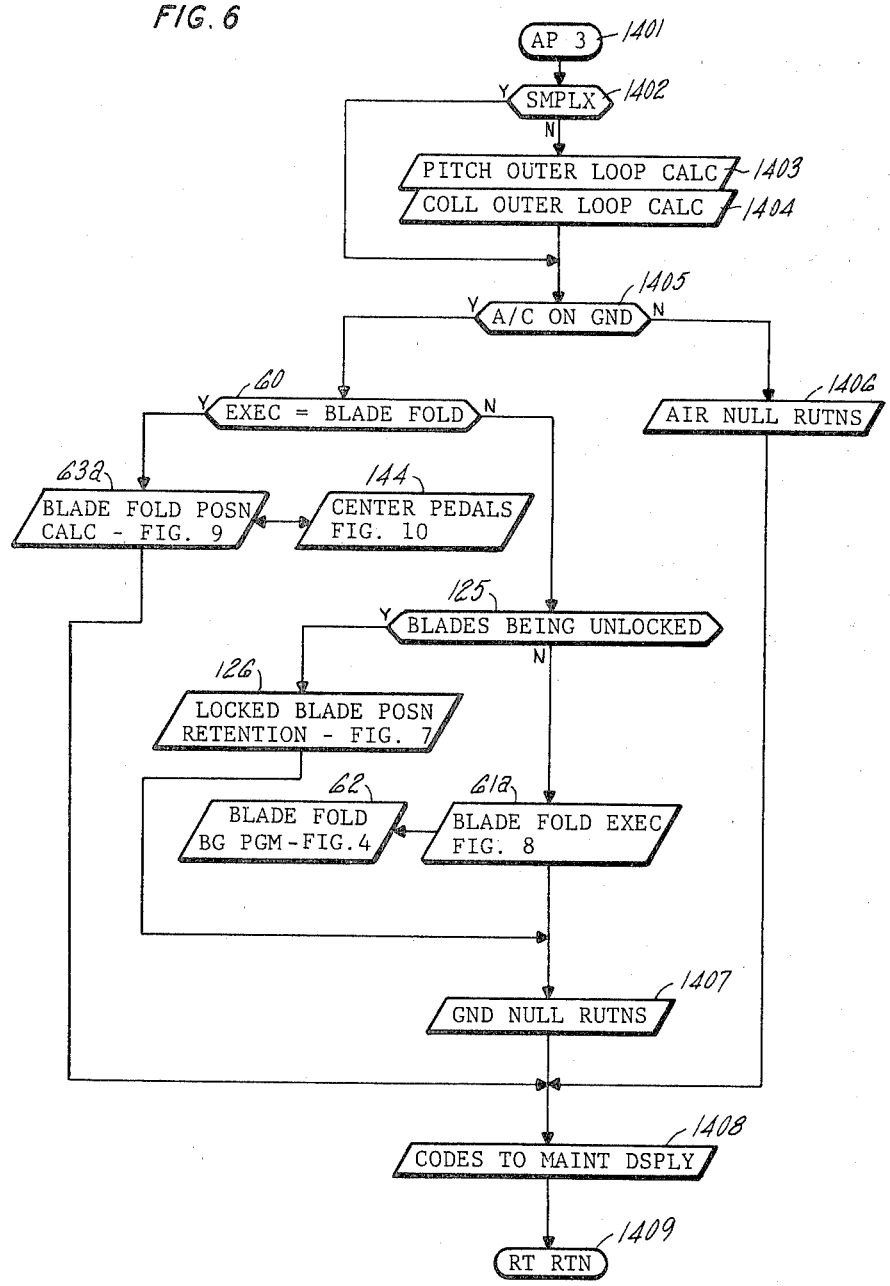
FIG. 6 is a variation of the logic flowchart of FIG. 2, which incorporates improvements of the present invention.

The blade fold positioning described with respect to FIGS. 2-5 hereinbefore all takes place during the blade folding operation. In the embodiment of the invention to be described, the storage of servo position deviations occurs at a totally different time in the history of the helicopters: that is, at the time that the blades are to be unfolded or spread. In order to achieve this, the third autopilot program is modified as illustrated in FIG. 6 so that there are three different routes in which the third autopilot program can proceed when the aircraft is on the ground. Specifically, in FIG. 6, when test 1405 indicates that the aircraft is on the ground, the test 60 can determine whether the executive is in the blade fold mode or not. In the normal case, it is not. This reaches a test 125 which examines a flag bit indicative of whether the blades are now being unlocked or not. This flag can respond to a spread command switch energized by the pilot, or to some other function at an appropriate point in a procedure of unlocking the blades after respreading the blades for use. During a spread operation, there will be one pass through the third autopilot program where test 125 will be affirmative. This will cause the program to advance to a locked blade position retention routine 126, which is described with respect to FIG. 7 hereinafter. But when the third autopilot routine is reached with the aircraft on the ground in other than a spread operation, test 125 will always be negative causing the blade fold executive routine to be reached in the manner described hereinbefore. However, in the case of the embodiment of the invention to be described, a blade fold executive routine 61a, which differs in some respect from the blade fold executive routine 61 illustrated in FIG. 3, is required, and this is described with respect to FIG. 8, hereinafter.

Figure 7:
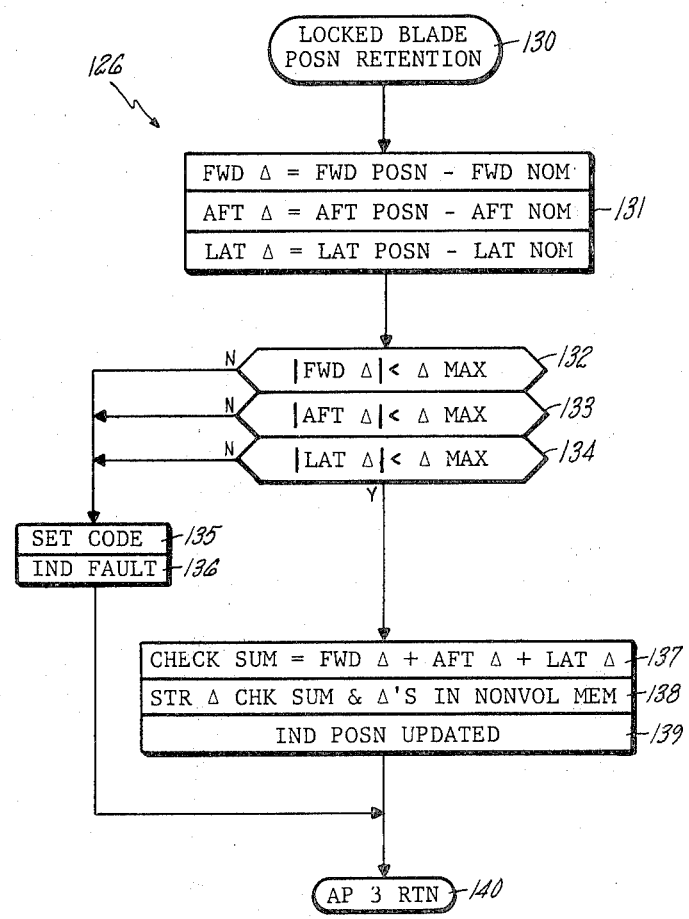
FIG. 7 is a simplified logic flowchart of a routine for retaining positions of locked blades for use in subsequent blade locking operations.

In FIG. 7, the locked blade position retention routine 126 is reached through an entry point 130. A series of steps 131 generates deviations of the forward, aft and lateral servo positions from nominal values of forward, aft and lateral positions found in a read only memory. This is achieved by reading the values indicated by the servo position detectors 20-22 (FIG. 1) and subtracting therefrom the corresponding nominal values read out of a read only memory. Then a series of tests 132-134 check each of these deviations to ensure that each is less than some maximum permissible deviation. This may be done by comparing the absolute value of each with an unsigned maximum deviation, or it may be done by testing each to be sure that it is not more positive than a positive value nor more negative than a negative value, all as is well known in the art. If any of the deviations is excessive, a negative result from one of the tests 132-134 will cause the locked blade position retention routine to reach a step 135 which will set failure codes and a step 136 which will provide an indication that there is fault in the system. But if all of the deviations are less than the maximum permissible value, each of the tests 132-134 will be affirmative so that a step 137 will be reached in which a check sum value for the deviations is calculated by summing all three deviations together. The deviations calculated in steps 131 and the check sum calculated in step 137 are all stored in nonvolatile read/write memory in step 138. These deviations will therefore be available at a later time when the blades are to be folded, for use in calculating the necessary automatic flight control system trim commands so as to reposition the pitch angle of the blades of the positions they are at when the deviations were stored. Then a step 139 provides an indication to the pilot that the pitch angle positions for blade folding have been updated so that he may engage a switch to cause the next sequence of blade spreading to occur (which forms no part of the present invention, and is not described further herein). Then, the program reverts to the third autopilot routine of FIG. 6 through a return point 140.

Figure 8:
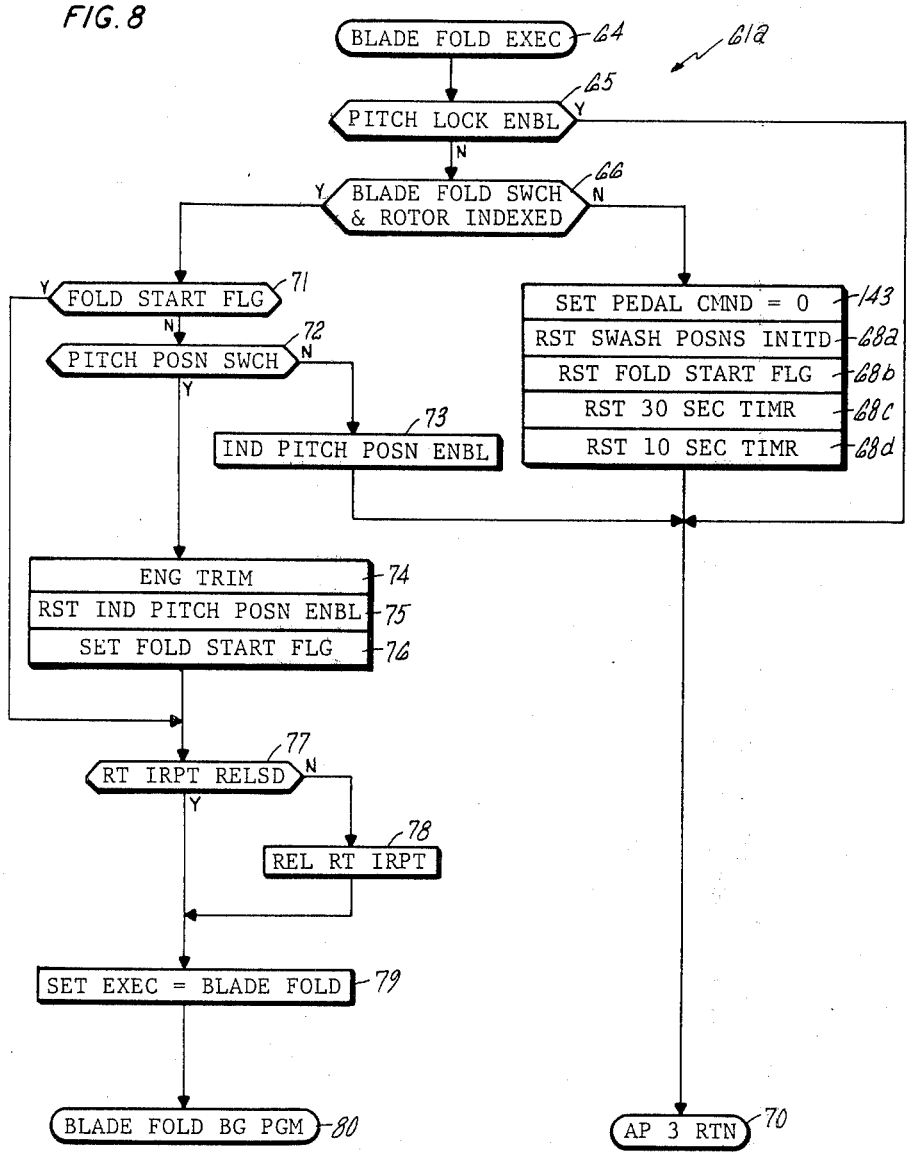
FIG. 8 is an alternative to the simplified logic flowchart of FIG. 3, incorporating features utilized in the present invention.

As the computer passes repetitively through a third autopilot routine during normal operations, when the aircraft is on the ground, when blade folding has not reached the stage where the executive of the computer is set in a blade fold mode, and the blades are not being unlocked, test 1405 is affirmative, test 60 is negative and test 125 is negative so that the blade fold executive test program 61a is reached at illustrated in FIG. 8. The only differences between the blade fold executive program 61a and the blade fold executive program 61 illustrated in FIG. 3, are that the storage of values for use in the next operation by means of tests and steps 116-121 is eliminated, since these functions are instead performed during blade spread as described with respect to FIG. 7; and, instead of resetting the new values stored flag in step 61 of FIG. 3, the initialization includes setting a pedal command equal to zero in an initialization step 143. The remainder of FIG. 8 is the same and performs the same function as described hereinbefore with respect to FIG. 3.

In FIG. 8, the blade fold executive program 61a will perform no function whatsoever once pitch positioning has been complete and the blade fold background program 62 (FIG. 4) has reached step 93 and set the pitch lock enable flag. This will cause test 65 (FIG. 8) to always be affirmative and thereby bypass the remainder of the blade fold executive routine 61a.

During the blade fold sequencing, the blade fold executive program 61a will eventually reach step 79 (as is described with respect of FIG. 3, hereinbefore) so that the computer has its executive set into the blade fold mode. Then, in subsequent passes through the third autopilot routine of FIG. 6, the blade fold position calculation routine 63a is reached, as is described with respect to FIG. 9 hereinafter. This routine includes, in the exemplary embodiment described herein, a center pedals subroutine 144, as is described with respect to FIG. 10 hereinafter.

Figure 9:
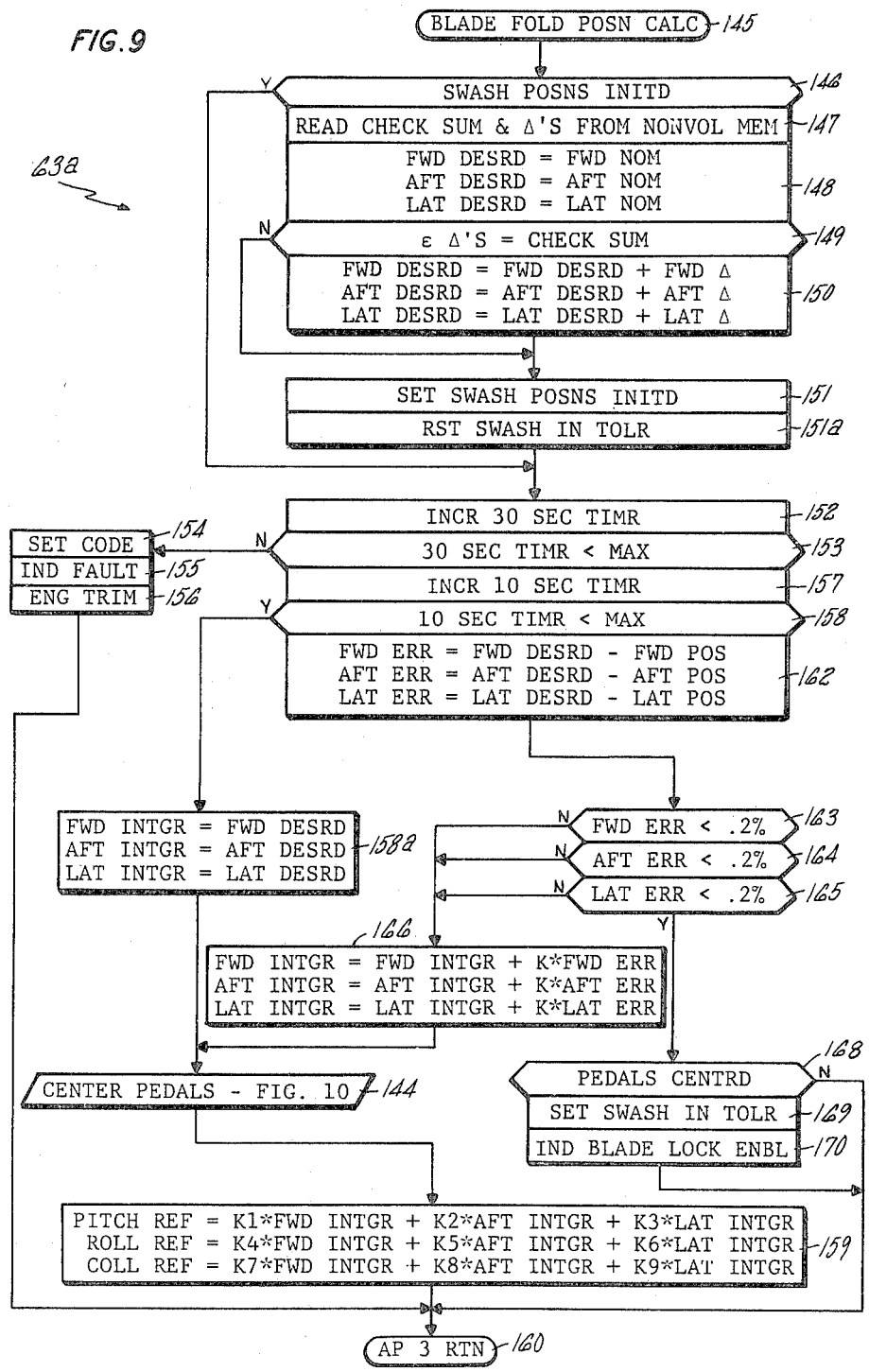
FIG. 9 is an alternative to the logic flowchart of FIG. 5, representing a routine for calculating blade folding positions and commands in accordance with the improvement of the present invention.

In FIG. 9, the blade fold position calculation routine 63a is reached through an entry point 145 and a first test 146 determines if the swash plate servo positions have been initiated or not by interrogating a once-only flag, set as described hereinafter. In the first pass through the routine, the result of test 146 is negative so that a series of steps 147 is reached to cause reading from nonvolatile memory the three servo position deviations and their corresponding check sum. Then in a series of steps 148, values of desired forward, aft and lateral swash plate positions are set equal to the corresponding nominal positions which are provided from a read only memory. In a test 149, the swash plate position deviations read in step 147 are summed together and the result is compared against the check sum read in step 147, to see if there has been any apparent error in the storage and retrieval of the swash plate position deviations in nonvolatile memory. If the data is still correct, then the deviations are added to the desired positions in a series of steps 150. But if the check sum test 149 indicates error, then the steps 150 are bypassed and only the nominal values can be used as desired values. This use of the nominal swash plate positions causes the servos to position the pitch angle of the blades close to the lock position, to aid maintenance personnel in manually adjusting them, upon initial computer operation, or after maintenance. In either event, a step 151 sets the swash positions initiated flag utilized in test 146, and the swash in tolerance flag is reset in a step 151a. Therefore in subsequent passes through the routine 63a, the tests and steps 147-151a will be bypassed and the program will advance from test 146 directly to a step 152 which increments the thirty second timer. A test 153 determines if the thirty second timer has been incremented to less than its nominal value; if not, this means an excessive amount of time has elapsed since the first pass through the blade fold position calculation routine 63a, so that a negative result of test 153 will lead to steps 154-156 which set failure codes, indicate a fault on the control panel, and cause the trim to be engaged to enable resynching of the trim after the abortive conclusion of the attempt to position the pitch angle of the blades for folding.

If the thirty second timer has not timed out, an affirmative result of test 153 will reach a step 157 in which the ten second timer is incremented. A test 158 determines if the ten second timer has been incremented to less than its maximum value. If it has, an affirmative result of test 158 reaches a series of steps 158a to initiate integrator registers to the desired swash plate servo positions, and thence to the center pedals subroutine 144, which is described with respect to FIG. 7, hereinafter. When the subroutine 144 has been passed through, a series of steps 159 generate the inverse matrix of the mixer utilizing the current integrator values for the forward, aft and lateral swash plate servos to generate pitch, roll and collective reference values for use by the computer in generating pitch, roll and collective trim commands for application on the connections 42-44 (FIG. 1) to the respective servo trim actuators 39-41 (FIG. 1). And then the program will revert to the third autopilot routine through a return point 160. In subsequent passes through the blade fold position calculation routine 63a, eventually test 158 will indicate that more than ten seconds has elapsed since the first trim reference values were generated in step 159. This means that the servos 31-33 (FIG. 1) have had ten seconds at their 10% per second rate to achieve up to 100% of their permissible motions, whereby any trim reference value calculated in steps 159 should have been achieved at this point. When the ten second timer reaches maximum, a negative result from test 158 will lead to steps 162 which compare the desired swash plate servo positions with the actual swash plate servo positions indicated by the position detectors 20-22 (FIG. 1). If the swash plate servos have been positioned very close to the desired amount, a series of tests 163-165 may all be affirmative. But if any of the servo position errors is in excess of 0.2% of the total servo positioning range, then a negative result of any one of the tests 163-165 will lead to steps 166 in which the integrators for the forward, aft and lateral swash plate servos are incremented by an integration constant times the corresponding error. This integration is one of the features of the invention and avoids any long term errors, including overshoots, which occur as a result of mechanical errors in trim actuation and linkages that determine the swash plate servo positions, and variations due to non-zero series actuator positioning and yaw sensor errors. In the normal course of events, successive passes through the blade fold position calculation routine 63a (reached through the third autopilot program in successive computer real time interrupts, as described hereinbefore) will cause the swash plate position servo integrators to be integrated to values which, after inverse matrix calculation (159), provided correct pitch, roll and collective references which drive the system to the desired swash plate servo positions. During the first ten seconds when the steps and tests 162-166 are bypassed, and subsequently when the steps and tests 162-166 are included, the center pedals routine 144 (described hereinafter with respect to FIG. 7) is also performed. Thus, eventually, the pedals should be centered as described hereinafter and eventually the errors should all be less than 0.2%. Thus an affirmative result from all three tests 163-165 will lead to a test 168 which determines if the pedals are in fact centered. If not, the program simply exits through the return point 160. But if the pedals are centered, an affirmative result of test 168 will lead to a step 169 which sets the swash in tolerance flag which is utilized in the blade fold background program of FIG. 4 to recognize the end of the blade fold mode of operation in the computer. And a step 170 commands the blade lock to engage and indicates to the pilot that the blade lock is enabled.

In the embodiment of the invention described with respect to FIGS. 1-5, hereinbefore, a simple method is shown for centering a series actuator in an open loop fashion, to eliminate discrepancies in swash plate servo position as a consequence of variations in series actuator position. There are other design criteria of helicopters which may provide problems that need to be overcome in order to provide the improved blade pitch angle positioning according to the invention. For instance, in the case of an aircraft having a canted tail rotor (such as is disclosed in U.S. Pat. No. 4,103,848) any variation in tail rotor pitch and/or speed will affect the pitch axis of the helicopter. Therefore, there may be coupling between tail rotor blade pitch angle commands and longitudinal cyclic pitch commands in order to compensate for the effect of the tail rotor on the pitch axis. In a typical case, the coupling is such that there is essentially no effect on the pitch axis when the tail rotor pedals are centered, but increments of positive and negative variations can be applied when the pedals are pushed to the right or to the left respectively. Therefore, the centered pedal position can be taken as a neutral position insofar as eliminating tail rotor coupling into the pitch axis is concerned to enable utilizing the trim system to position the pitch angle of the main rotor blades in accordance with the invention. In any case in which there is a position detector directly coupled to the yaw trim servo, the yaw trim servo could be positioned to a center position in the simple fashion described with respect to the series actuator in FIG. 5 hereinbefore. But in a case where the position detector utilized to close the servo loop is engagable at different positions to represent a selective synchronized trim position, the position detector only indicates relative position with respect to whatever position of the trim servo it was engaged at. Therefore, the relative position detector does not provide an indication of where the yaw trim servo is located. In addition, all helicopters are provided with coupling between the collective pitch and the tail rotor pitch. Yet another problem which may occur is the inability of a trim system to provide a command equal to 100% of authority (from maximum negative to maximum positive, equal to driving from full left pedal to full right pedal), Therefore, utilization of the present invention requires a certain degree of accommodation to one or more of the foregoing problems.

Figure 10:
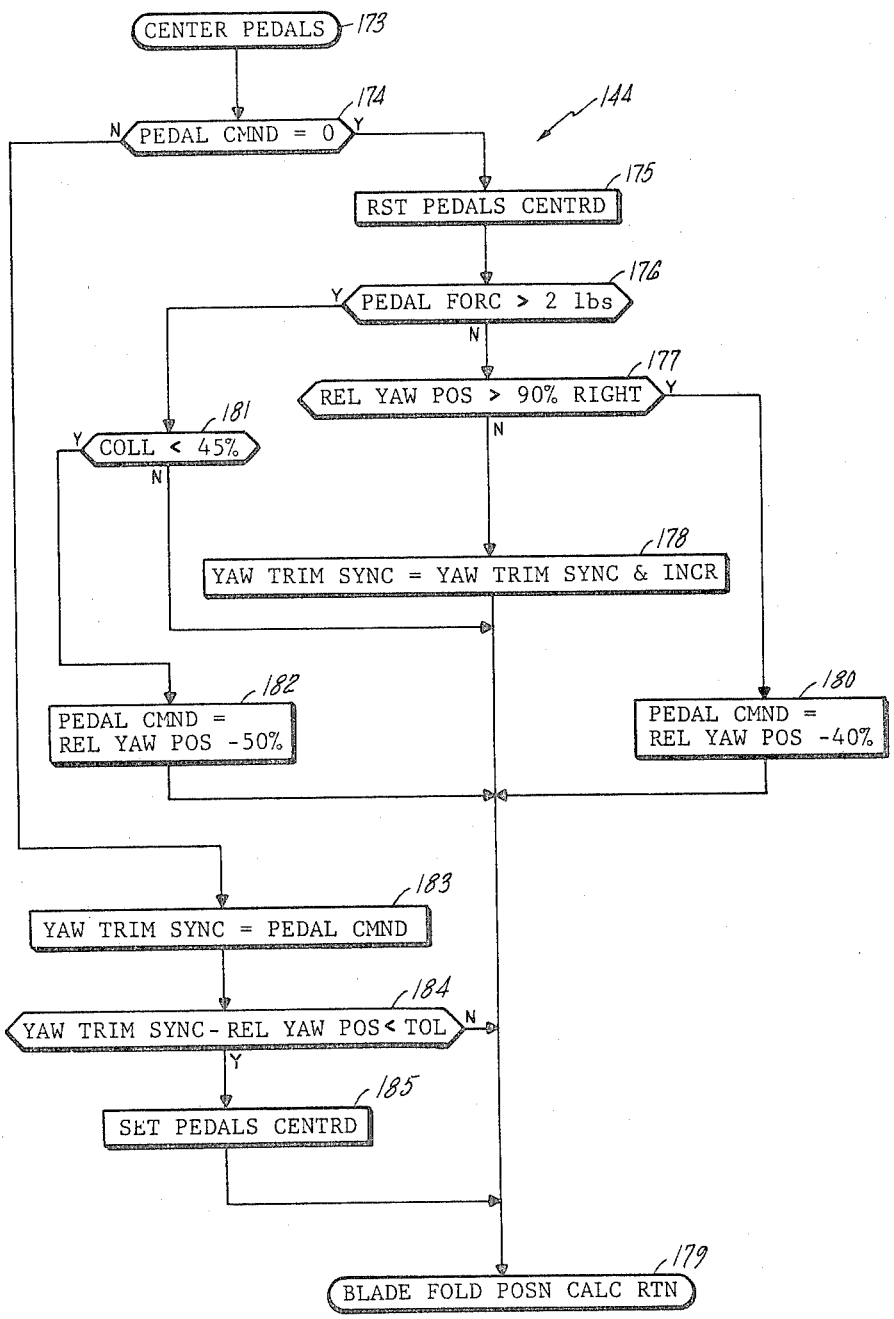
FIG. 10 is a simplified logic flowchart of a routine for centering yaw pedals (tail rotor pitch angle) in a system in which the tail rotor pitch position indication is a function of the point of trim engagement.

In accordance with another aspect of the invention, a center pedals subroutine 144 which accommodates the foregoing problems is reached in FIG. 10 through an entry point 173. In this subroutine, the yaw trim piston is first driven all the way to the left stop (if it can be) and then it is driven back through 50% of authority as indicated by the relative position detector. This overcomes the problem of not knowing the actual trim piston position represented by the relative position detector. But, if the pedals are initially set at or near a full right position, limiting of the trim command will preclude providing a large enough command signal to drive the pedals fully to the left. The subroutine 144 therefore senses a case where the relative position detector indicates a relative position in excess of 90% of full authority and will reposition the piston by 40% of the full authority as indicated by the relative position detector. This overcomes the problem of having less than full authority in the yaw trim channel. Additionally, the subroutine of FIG. 10 takes into account that for collective stick positions equal to 50% or greater, there is coupling between the collective stick and the yaw pedal stops, which can affect the stop-referenced, relative pedal positioning to be achieved in the center pedals routine. When it can be determined that the yaw trim piston has been driven as far to the left as it can, then either a 40% or a 50% of authority correction is utilized as a command synchronizing position to drive the pedals to or near center position.

A first test in the subroutine 144 of FIG. 10 is a test 174 to determine if any pedal command has been generated. During the initial phases of the subroutine, there is no pedal command since it is reset to zero in the initialization step 143 (FIG. 8). Therefore, an affirmative result of test 174 leads to the portion of the program which attempts to drive the yaw trim piston fully to the left so that it can be backed off therefrom to the center, utilizing a relative position detector. A step 175 resets the pedals centered flag that is eventually interrogated in test 168, FIG. 9; when this subroutine has completed its task, the pedals centered flag will be set so that the blade lock enable signal can be generated. Then a test 176 determines if pedal force is greater than 2 lbs. (about 1 kilogram); when the pedal force does reach about 2 lbs., this is an indication that the trim detent spring is being extended as a consequence of the yaw trim piston being pushed to the extreme left. Thus it is therefore known that the pedals have reached a stop. Until this occurs, a negative result of test 176 will reach a test 177 to determine if the relative yaw position exceeds 90% of total authority. If it does, this is an indication that its zero position must have been set at or near full right pedal, and that the trim system will not have a sufficient authority to drive the yaw trim piston into the left pedal stop and therefore no 2 lb. indication will be available. If test 177 is negative, a yaw trim synch command is generated equal to an original yaw trim synch command plus an increment in a step 178. The increment is such as to command the pedals to move to the left. This increment can be chosen so as to cause the pedals to advance slowly to the left stop in a desired fashion. And then, the subroutine 144 will revert to the blade fold position calculation routine 63a of FIG. 9 by means of a return point 179. If, on the other hand, before 2 lbs. is sensed in the test 176, the relative yaw position exceeds 90% of full authority in the left hand direction, test 177 will be affirmative so that a step 180 will generate a pedal command equal to the relative yaw position minus 40% of authority, which will bring the yaw trim piston back near the center position. To the extent that the yaw trim piston is not centered, the pitch, roll and collective reference signals generated in the step 159 (FIG. 9) will be incorrect, so that the swash plate servo errors generated in step 162 will be significant. However, these errors will be integrated out in the steps 166 so that pitch, roll and collective reference signals will eventually be generated to drive the swash plate servos to the desired positions. Thus, some error in pedal centering is tolerable in accordance with the present invention due to the integration of swash plate servo error in generating the trim commands.

If on the other hand, the pedal force reaches 2 lbs. the test 176 will be affirmative so that a test 181 will be reached to determine if the collective stick position has been driven to a point below 45% of authority. If it has not, no functions are performed in the subroutine 144 but the program reverts through the return point 179 to the blade fold position calculation routine of FIG. 9. By choosing the blade pitch angle for blade locking of the blades to correspond to low collective pitch command, the trim system, by means of the collective reference signal generated in step 159, will eventually drive the collective stick position below 45% authority. When the collective pitch has been driven to a point below 45% of authority, an affirmative result of the test 181 will reach a step 182 which causes a pedal command to be generated equal to the relative yaw position minus 50% of yaw authority. Thus, the first portion of the subroutine 144 in FIG. 10 simply tries to place the yaw piston in a known position and then uses the relative yaw position to generate a command to drive the yaw trim piston back to center (or near it).

When either of the steps 180, 182 has established a pedal command, its non-zero condition will cause a negative result of test 174 which will reach a step 183 in which the yaw trim synch is now set equal to the recently generated pedal command. This pedal command is, in either instance, a relative pedal command since it is based upon the relative yaw position detector. The yaw trim piston is therefore driven closed loop, the loop being closed by the relative position detector. This occurs in every pass through the subroutine by means of a test 184 which determines if the relative yaw position now being indicated by the relative yaw position detector is within some tolerance of the yaw trim synch being repetitively commanded in each cycle. When the relative yaw position equals the command given, a step 185 sets the pedals centered flag which is utilized in the blade fold position calculation routine of FIG. 9. Depending upon the starting conditions and response times of the various portions of the system, it is possible to have the swash plate almost correctly positioned prior to centering of the pedals; in that case, the final positioning achieved by the blade fold position calculation routine of FIG. 9 may only be taking out the errors which result from the pedals not being centered until the pedals become centered. In other cases, the pedals may become centered long before the swash plate positions are near their correct setting. In either event, it takes both the positioning of the swash plate servos and the centering of the pedals in order to effectively recognize that the blades have been correctly positioned by setting the swash in tolerance flag, in step 169 of FIG. 9.

Although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A helicopter having foldable main rotor blades, the pitch angles of which are positionable by push rods in dependence upon the vertical position and tilt of a swash plate cooperating with said push rods, said blades being lockable at specific pitch angles as a prerequisite to folding, said swash plate being positioned by a plurality of servos, each of said servos being separately operable in response to corresponding outputs of a mixer, the mixer in turn receiving inputs from pitch, roll and collective channels, each of said channels including an electrically operable trim actuator for providing a corresponding input to said mixer in response to a related trim command signal, a position detector for each of said servos, each position detector providing a servo position signal indicative of the position of a corresponding one of said servos, and signal processing means for storing a plurality of desired position signals indicative of corresponding predetermined servo positions at which rotor blade pitch angle would be correct for locking, for providing pitch, roll and collective reference signals indicative of corresponding trim commands to be applied to said pitch, roll and trim actuators, and for providing trim command signals to said pitch, roll and collective trim actuators in respective response to said pitch, roll and collective reference signals, characterized by:

said signal processing means comprising means for providing said reference signals by generating, in response to all of said desired position signals, reference signals corresponding to trim command signals which will cause said trim actuators to provide inputs to said mixer to cause said servos to be driven substantially to said predetermined positions as indicated by said servo position signals.

2. A helicopter according to claim 1 further characterized by said signal processing means comprising a nonvolatile read/write memory and a read only memory, said desired position signals each being stored in the form of a nominal desired position signal in said read only memory and a deviation signal, indicative of the amount by which the related desired position deviates from the position indicated by the corresponding nominal desired position signal, in said read only memory.

3. A helicopter according to claim 1 further characterized by said signal processing means for providing a plurality of integrator signals, each initially generated to be equal to a corresponding one of said desired position signals, for providing a plurality of error signals, each indicative of the difference in the position indicated by a related one of said desired position signals and the position indicated by a corresponding one of said servo position signals, for modifying each integrator signal by an amount dependent on the related one of said error signals, and for generating each of said reference signals in response to the related one of said integrator signals.

4. A helicopter according to claim 1 characterized by means for providing a blade signal indicative of the fact that said main rotor blades have been respread after having been folded and are about to be unlocked, and said signal processing means stores said servo position signals as said desired position signals in response to said blade signal.

* * * * *